US012524398B1

(12) United States Patent
Burhanuddin et al.

(10) Patent No.: US 12,524,398 B1
(45) Date of Patent: Jan. 13, 2026

(54) DATA QUESTION ANSWERING WITH AUXILIARY RECOMMENDATIONS

(71) Applicant: Adobe Inc., San Jose, CA (US)

(72) Inventors: Iftikhar Ahamath Burhanuddin, Bangalore (IN); Xiang Chen, San Jose, CA (US); William Brandon George, Pleasant Grove, UT (US); Wei Zhang, Great Falls, VA (US); Uttaran Bhattacharya, College Park, MD (US); Tong Yu, Fremont, CA (US); Sungchul Kim, San Jose, CA (US); Said Kobeissi, Lovettsville, VA (US); Ryan A. Rossi, San Jose, CA (US); Ritwik Sinha, Cupertino, CA (US); Razvan-Alexandru Balan, Bucharest (RO); Prithvi Bhutani, Lynnwood, WA (US); Michael Edwin Rimer, Lindon, UT (US); Md mehrab Tanjim, Santa Clara, CA (US); Jordan Henson Walker, Lehi, UT (US); Jiabin Geng, Lehi, UT (US); Harshita Chopra, New Delhi (IN); Guillaume L. Escarguel, San Diego, CA (US); Brandon Galen Mooso, Jordan, UT (US); Atanu R. Sinha, Bangalore (IN); Andrei Zugravu, Bucharest (RO); Abhisek Trivedi, South Jordan, UT (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 18/767,106

(22) Filed: Jul. 9, 2024

(51) Int. Cl.
*G06F 7/00* (2006.01)
*G06F 16/242* (2019.01)
(Continued)

(52) U.S. Cl.
CPC ........ *G06F 16/2425* (2019.01); *G06F 16/243* (2019.01); *G06F 16/24575* (2019.01); *G06F 16/248* (2019.01)

(58) Field of Classification Search
CPC ............... G06F 16/2425; G06F 16/243; G06F 16/24575; G06F 16/248; G06N 5/04;
(Continued)

(56) References Cited

U.S. PATENT DOCUMENTS

2023/0135625 A1* 5/2023 Wang .................. G06F 18/2113
704/9
2023/0394328 A1* 12/2023 Wei ........................ G06N 5/022
(Continued)

OTHER PUBLICATIONS

Google, "[UA] Ask Analytics Intelligence [Legacy]", [retrieved from the internet on Oct. 4, 2024], <https://support.google.com/analytics/answer/7347597?hl=en>, 2024, 3 pages.
(Continued)

*Primary Examiner* — Mohammad A Sana
(74) *Attorney, Agent, or Firm* — FIG. 1 Patents

(57) ABSTRACT

Techniques for data question answering with auxiliary recommendations are described to enable efficient querying of data sets for answers to data questions based on a natural language input. In an example, a processing device is operable to receive a natural language input including a query, determine an additional query based on a context of the query, and query a machine-learning model using the query and the additional query. The processing device is further operable to receive, from the machine-learning model, a result including a quantitative answer to the query, an additional answer based on the additional query, and an explanation by the machine-learning model of how the machine-learning model generated the quantitative answer or the additional answer in response to the querying. The
(Continued)

processing device is operable to present the result for display in a user interface.

20 Claims, 16 Drawing Sheets

(51) Int. Cl.
  *G06F 16/2457* (2019.01)
  *G06F 16/248* (2019.01)

(58) Field of Classification Search
  CPC ........ G06N 3/044; G06N 3/0455; G06N 3/08; G06N 20/00

See application file for complete search history.

(56) References Cited

U.S. PATENT DOCUMENTS

2024/0303539 A1* 9/2024 Kattepur ................ G06N 5/045
2025/0086434 A1* 3/2025 Wiesmann Rothuizen ................
                                                G06N 3/0455

OTHER PUBLICATIONS

Tableau Desktop, "Automatically Build Views with Ask Data", [retrieved from the internet on Oct. 4, 2024], <https://help.tableau.com/current/pro/desktop/en-us/ask_data.htm>, 2024, 22 pages.

Thoughtspot, "Welcome to the Modern Analytics Cloud: AI-Powered Analytics for your modern data stack", [retrieved from the internet on Oct. 4, 2024], <https://www.thoughtspot.com/product>, 2024, 20 pages.

"Foreign Office Action", RO Application No. 202400403, Feb. 28, 2025, 4 pages.

* cited by examiner

410

412
A. if num_months == 1:
   i. Generate insights [previous_month]: request data with modified payload (dateRange = previous month's dateRange)
   ii. Generate insights [previous_year]: request data with modified payload (dateRange = previous year's dateRange)
   iii. Auxiliary information: "The {intent} for {dateRange_previous_month} is {metric_value_previous_month} and the percent change is {compute_percentage_change(metric_value, metric_value_previous_month)}. The {intent} for the same month last year is {metric_value_previous_year} and the percent change is {compute_percentage_change(metric_value, metric_value_previous_year)}."

414
B. Else if num_months >1 and dimension==dateRangeMonth:
   i. Generate insights [previous_year]: request data with modified payload (dateRange = previous year's dateRange)
   ii. Generate insights [previous_3year]: request data with modified payload (dateRange = previous 3 years' dateRange)
   iii. Auxiliary information: "The {intent} for the same months last year is {metric_value_previous_year} and the percent change is {compute_percentage_change(metric_value, metric_value_previous_year)}. The Compound Annual Growth Rate (CAGR) for {dateRange_previous_3year} is {compute_CAGR(metric_value, metric_value_previous_3year)} %.'

416
C. Else if num_year==1 and dimension==dateRangeYear:
   i. Generate insights [previous_year]: request data with modified payload (dateRange = previous year's dateRange)
   ii. Generate insights [previous_3year]: request data with modified payload (dateRange = previous 3 years' dateRange)
   iii. Auxiliary information: "The {intent} for the same months last year is {metric_value_previous_year} and the percent change is {compute_percentage_change(metric_value, metric_value_previous_year)}. The Compound Annual Growth Rate (CAGR) for {dateRange_previous_3year} is {compute_CAGR(metric_value, metric_value_previous_3year)} %.'

418
D. else: Range spanning more than one year
   Auxiliary information: null

Fig. 4-2

Answer Templates 608

| intent | Natural language template |
|---|---|
| total | 'the total is ' + VALUE |
| maximum | 'the maximum is ' + VALUE |
| minimum | 'the minimum is ' + VALUE |
| difference | 'the difference is ' + DIFFERENCE |
| comparison | 'metric value of ' + DATERANGE0 + ' is less than ' + DATERANGE1<br>'metric value of ' + DATERANGE0 + ' is greater than ' + DATERANGE1<br>'metric value of ' + DATERANGE0 + ' is equal to ' + DATERANGE2 |
| temporal max | 'the maximum value of ' + VALUE + ' occurred on ' + VALUE_TEMPORAL |
| temporal min | 'the minimum value of ' + VALUE + ' occurred on ' + VALUE_TEMPORAL |

Fig. 6-2

Additional answer Templates
610

| intent | Auxiliary information reference timeframe | Natural language template |
|---|---|---|
| total | | 'the total for the metric ' + METRIC + ' is ' + VALUE |
| | Year | 'the total for the metric ' + METRIC + ' during the reference year' + Ref-YEAR + 'was ' + VALUE |
| | | 'the total for the metric ' + METRIC + ' during the previous year' + Prev-YEAR + 'was ' + VALUE |
| | | 'the change for the metric ' + METRIC + ' from previous year to reference year' + Prev-YEAR + 'to' + Ref-YEAR + 'was ' + VALUE |
| | | 'the CAG for the metric ' + METRIC + ' during the range of years' + Start-YEAR + 'to' + Ref-YEAR + 'was ' + VALUE |
| | Multi-year | 'the total for the metric ' + METRIC + ' during the range of years' + Start-YEAR + 'to' + Ref-YEAR + 'was ' + VALUE |
| | Month (same for quarter) | 'the total for the metric ' + METRIC + ' during the reference month' + Ref-MONTH + 'of the reference year' + Ref-YEAR + 'was ' + VALUE |
| | | 'the total for the metric ' + METRIC + ' during the previous month' + Prev-MONTH + 'of the reference year' + Ref-YEAR + 'was ' + VALUE |
| | | 'the change for the metric ' + METRIC + ' from previous month to reference year' + Prev-MONTH + 'to' + Ref-MONTH + 'was ' + VALUE |
| | | 'the total for the metric ' + METRIC + ' during the same month previous year' + Ref-MONTH + Prev-YEAR 'was ' + VALUE |
| | | 'the change for the metric ' + METRIC + ' from same month previous year to that of reference year' + Ref-MONTH + Prev-YEAR + 'to' + Ref-MONTH + Ref-YEAR + 'was ' + VALUE |
| | Arbitrary duration of Months | 'the total for the metric ' + METRIC + ' during the reference months' + Ref-Start-MONTH + 'to' + Ref-End-MONTH + Ref-YEAR + 'of the reference year' + Ref-YEAR + 'was ' + VALUE |
| | | 'the total for the metric ' + METRIC + ' during the same months previous year' + Ref-Start-MONTH + 'to' + Ref-End-MONTH + Prev-YEAR + 'was ' + VALUE |
| | | 'the change for the metric ' + METRIC + ' from same months previous year to that of reference year' + Ref-Start-MONTH + '-' + Ref-End-MONTH + Prev-YEAR + 'to' + Ref-Start-MONTH + '-' + Ref-End-MONTH + Ref-YEAR + 'was ' + VALUE |

Fig. 6-3

Explanation Templates
612

| intent | Auxiliary information reference timeframe | Natural language template |
|---|---|---|
| total | | 'the total for the metric ' + METRIC + ' is ' + VALUE |
| | Year | 'the total for the metric ' + METRIC + ' during the reference year' + Ref-YEAR + 'was ' + VALUE |
| | Explanation : Payload | { "metrics": ["variables/METRIC"],<br>"dimensions": {"variables/ daterangeyear "],<br>"timeRange": ["Ref-YEAR-01-01T00:00:00/Ref-YEAR-12-31T23:59:59"],<br>"intent": "total"<br>} |
| | | 'the total for the metric ' + METRIC + ' during the previous year' + Prev-YEAR + 'was ' + VALUE |
| | Explanation : Payload | { "metrics": ["variables/METRIC"],<br>"dimensions": ["variables/daterangeyear"],<br>"timeRange": ["Prev-YEAR-01-01T00:00:00/Prev-YEAR-12-31T23:59:59"],<br>"intent": "total"<br>} |
| | | 'the change for the metric ' + METRIC + ' from previous year to reference year' + Prev-YEAR + 'to' + Ref-YEAR + 'was ' + VALUE |
| | Explanation : Payload | [{ "metrics": ["variables/METRIC"],<br>"dimensions": ["variables/daterangeyear"],<br>"timeRange": ["Prev-YEAR-01-01T00:00:00/Prev-YEAR-12-31T23:59:59"],<br>"intent": "total"<br>},<br>{ "metrics": ["variables/METRIC"],<br>"dimensions": ["variables/daterangeyear"],<br>"timeRange": ["Ref-YEAR-01-01T00:00:00/Ref-YEAR-12-31T23:59:59"],<br>"intent": "total"<br>}] |
| | | 'the CAG for the metric ' + METRIC + ' during the range of years' + Start-YEAR + 'to' + Ref-YEAR + 'was ' + VALUE |
| | Explanation : Payload | [{ "metrics": ["variables/METRIC"],<br>"dimensions": ["variables/daterangeyear"],<br>"timeRange": ["Start-YEAR-01-01T00:00:00/Start-YEAR-12-31T23:59:59"],<br>"intent": "total"<br>},<br>{ "metrics": ["variables/METRIC"],<br>"dimensions": ["variables/daterangeyear"],<br>"timeRange": ["Ref-YEAR-01-01T00:00:00/Ref-YEAR-12-31T23:59:59"],<br>"intent": "total"<br>}] |
| | Month | 'the total for the metric ' + METRIC + ' during the reference month' + Ref-MONTH + 'of the reference year' + Ref-YEAR + 'was ' + VALUE |

Fig. 6-4

Results 614

When timerange in query is a year (specific year)
Query: What is the total revenue for 2023?
Response: The total for metric: Revenue during the reference year 2023 was 7908840.0
Auxiliary Information:
- The total for metric: Revenue during the previous year: 2022 was 567622.0
- The change for the metric: Revenue from previous year to reference year 2023 to 2022 was +1293.33%.
- The Compound Annual Growth (CAG) for metric: Revenue during the range of years: 2021 to 2023 was 283.26%.

Explanation:
Response Payload:
{ "metrics": ["variables/revenue"],
  "dimensions": ["variables/daterangeyear"],
  "timeRange": ["2023-01-01T00:00:00/2023-12-31T23:59:59"],
  "intent": "total"
}
Aux info Payloads:
[{ "metrics": ["variables/revenue"],
  "dimensions": ["variables/daterangeyear"],
  "timeRange": ["2022-01-01T00:00:00/2022-12-31T23:59:59"],
  "intent": "total"
},
{ "metrics": ["variables/revenue"],
  "dimensions": ["variables/daterangeyear"],
  "timeRange": ["2021-01-01T00:00:00/2023-12-31T23:59:59"],
  "intent": "total"
}]

Rationale in code: Because the timerange is one year, comparisons with previous year and over multiple past years make sense.

Fig. 6-5

Results 616

> When timerange in query is in months (*specific month*)
> Query: What is the total revenue for June 2023?
> Response: The total for the metric: Revenue during the reference month June of the reference year 2023 was 7643928.0
> Auxiliary Information:
> - The total for the metric: Revenue during the previous month: May of the reference year: 2023 was 39766.0 and
> - The change for the metric: Revenue from the previous month to reference month: May to June was the percent change is +19122.27%.
> - The total for the metric: Revenue during the same month previous year: June 2022 was 29217.0.
> - The change for the metric: Revenue from the same month previous year: June 2022 to that of reference year: June 2023 was +26062.60%.
>
> Explanation:
> Response Payload:
> { "metrics": ["variables/revenue"],
>   "dimensions": ["variables/daterangemonth"],
>   "timeRange": ["2023-06-01T00:00:00/2023-06-30T23:59:59"],
>   "intent": "total"
> }
> Aux info Payloads:
> [{ "metrics": ["variables/revenue"],
>   "dimensions": ["variables/daterangemonth"],
>   "timeRange": ["2023-05-01T00:00:00/2023-05-31T23:59:59"],
>   "intent": "total"
> },
> { "metrics": ["variables/revenue"],
>   "dimensions": ["variables/daterangemonth"],
>   "timeRange": ["2022-06-01T00:00:00/2022-06-30T23:59:59"],
>   "intent": "total"
> }]
>
> Rationale in code: Because the timerange is a specific month, comparisons with previous month and with same month in previous year make sense.

Fig. 6-6

Results 618

(*arbitrary duration less than a year*)
Query: What is the total revenue for June to December 2023?
Response: The total for the metric: Revenue during the reference months: June to Dec of the reference year: 2023 was 7696883.0
Auxiliary Information:
- The total for the metric: Revenue during the same months previous year: June to Dec 2022 was 368913.0.
- The change for the metric: Revenue from same months previous year to that of reference year June-Dec 2022 to June-Dec 2023 was +1986.37%

Explanation:
Response Payload:
{ "metrics": ["variables/revenue"],
  "dimensions": ["variables/daterangemonth"],
  "timeRange": ["2023-06-01T00:00:00/2023-12-31T23:59:59"],
  "intent": "total"
}
Aux info Payloads:
[{ "metrics": ["variables/revenue"],
  "dimensions": ["variables/daterangemonth"],
  "timeRange": ["2022-06-01T00:00:00/2022-12-31T23:59:59"],
  "intent": "total"
}]

Rationale in code: Because the time range is an arbitrary duration in months, comparisons with previous months do not make sense, but a same duration in previous year does.

Fig. 6-7

Results 620

When timerange is multiple years
Query: What is the total revenue from 2021 to 2023?
Response: The total for the metric: Revenue during the range of years: 2021 to 2023 was 9014883.0
Auxiliary Information:
- none

Explanation:
Response Payload:
{ "metrics": ["variables/revenue"],
  "dimensions": ["variables/daterangeyear"],
  "timeRange": ["2021-01-01T00:00:00/2023-12-31T23:59:59"],
  "intent": "total"
}
Aux info Payloads:
none

Rationale: Because the time range is a number of years, no natural comparison is merited and null results are returned.

Fig. 6-8

DATA QUESTION ANSWERING WITH AUXILIARY RECOMMENDATIONS

BACKGROUND

Data collected about a system or organization is analyzed to identify patterns, derive conclusions, and make predictions for understanding complex situations and guiding informed decision making. Conventional data analysis techniques are tedious and time consuming. Machine-learning models help to automate aspects of data analysis, such as to improve efficiency, avoid mistakes, and prevent information overload. Usefulness of answers obtained from machine-learning models depends on care and precision being applied in generating a query. If a machine-learning model misinterprets context or intent of a query, efficiency is reduced as a data analyst expends additional time and resources interacting with the model until a satisfactory answer is returned.

SUMMARY

Techniques for data question answering with auxiliary recommendations are described to enable efficient querying of data sets for answers to data questions based on a natural language input. In an example, a data question and answer module leverages machine learning, such as a large language model, to query a data set and derive an answer to a data question inferred from a natural language input. Based on the answer, the data question, or both, the data question and answer model configures the large language model to anticipate relevant follow-up questions not directly asked by the natural language input. An output from the large language model includes the answer to the data question originally asked, as well as auxiliary information queried from the data set to provide answers to the anticipated follow-up questions. The data question and answer model causes the large language model to generate an explanation about how the answer to the original data question and the auxiliary information is derived. The auxiliary information and the explanations increase confidence in answers to the original data question being asked from the natural language inputs. While conventional data analysis techniques are tedious and time consuming, the data question and answer module efficiently (e.g., with fewer user inputs) generates robust answers to data questions that are supported by explanations and additional context from the data set.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4-1 depicts an example implementation of a data query module of FIG. 2 in greater detail as employing techniques described herein for determining data queries based on a context of a query determined from a natural language input.

FIG. 4-2 depicts example pseudo source code executed by the implementation of the data query module depicted in FIG. 4-1 to determine data queries.

FIG. 6-1 depicts an example implementation of an explanation module of FIG. 2 in greater detail as employing techniques described herein for determining results of data question answering with auxiliary recommendations.

FIGS. 6-2 to 6-4 depict example answer and explanation templates utilized by the implementation of the explanation module depicted in FIG. 6-1 as employing techniques described herein for determining results of data question answering with auxiliary recommendations.

FIGS. 6-5 to 6-8 depict example results output from the implementation of the explanation module depicted in FIG. 6-1 as employing techniques described herein for data question answering with auxiliary recommendations.

FIG. 7 is a flow diagram depicting an algorithm as a step-by-step procedure, which is performable by a processing device to use data question answering with auxiliary recommendations.

FIG. 8 illustrates an example system including various components of an example device usable as any type of computing device as described and/or utilized with reference to FIGS. 1 to 7 to implement examples of the techniques described herein.

DETAILED DESCRIPTION

Overview

Figure 1:
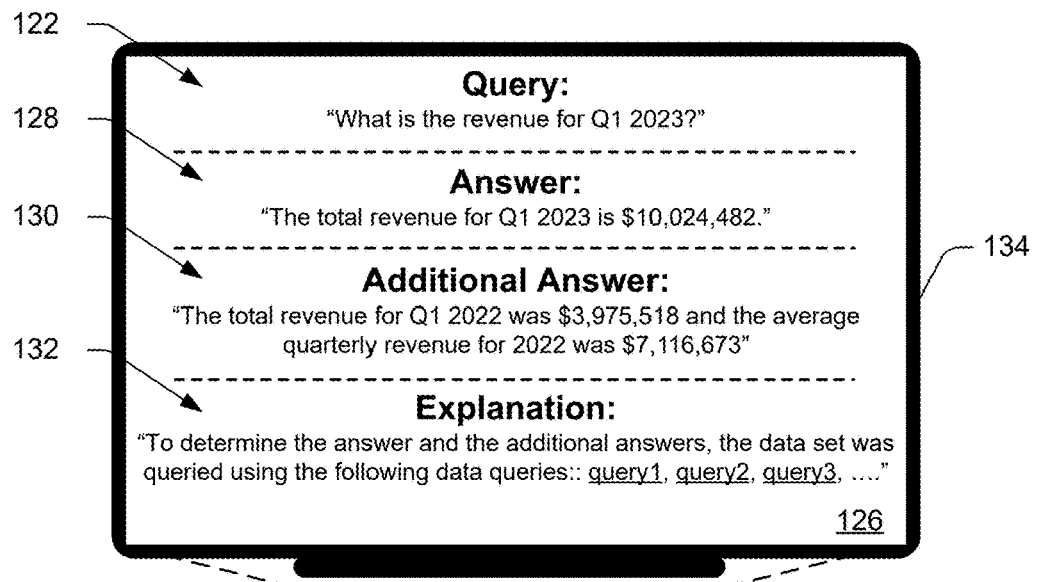
FIG. 1 is an illustration of a digital medium environment in an example implementation that is operable to employ data question techniques including answering with auxiliary recommendations as described herein.
Figure 1:
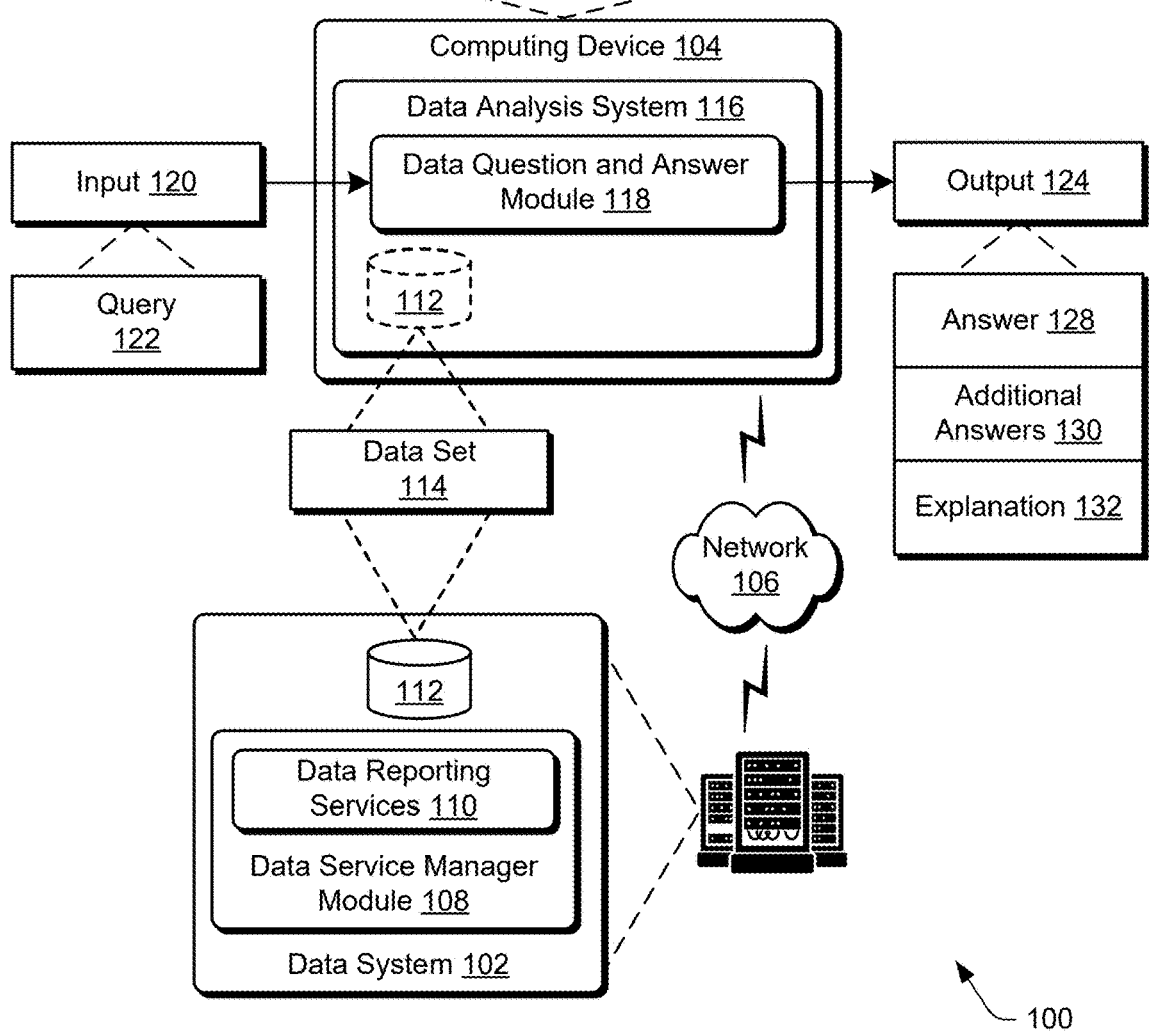

Systems and organizations collect large amounts of data. Data analysts interpret these large data sets to identify patterns, derive conclusions, and make predictions for understanding complex situations and guiding informed decision making. Conventional data analysis techniques are tedious and time consuming. Data analysts are often overwhelmed with the amount of data and experience information overload.

Machine-learning techniques are useful to automate aspects of data analysis, such as to improve efficiency and avoid mistakes when interpreting the data. A computer model, for instance, is trainable using machine-learning to analyze a data set and automatically determine answers to questions based on input queries to the model. Machine-learning models are imperfect, however, and obtaining a useful answer in response to an initial query depends on a degree of care and precision applied in crafting the query. For example, when an input query is vague or too broad, machine-learning models fail to provide sufficient answers. When input queries are overly specific, answers provided by the models fail to consider context or mention other factors useful to understanding the data. Machine-learning models frequently receive additional follow-up queries until a satisfactory answer results, which negatively impacts efficiency.

Accordingly, techniques for data question answering with auxiliary recommendations are described. The techniques are configurable to query data sets, based on natural language inputs, to efficiently obtain robust answers to specific data questions, as well as anticipated follow-up questions. To do so, a data analysis system employs a data question and answer module that leverages a machine-learning model (e.g., a large language model) to apply knowledge about anticipated follow-up questions based on context and/or results of an initial query. The machine-learning model automatically derives additional queries for a data set to obtain auxiliary information that increases robustness of an answer, which is output in response to an original data question determined from the natural language inputs. The data question and answer module further leverages machine-learning to increase confidence in the answers by automatically generating explanations that convey how the answers and auxiliary information is derived. The output from the data question and answer module is usable in a variety of ways, including for interpreting the data set, ensuring accuracy in the results of the data analysis system, and for mitigating against performing further data queries, which improves efficiency.

Consider a scenario in which a query is received as a natural language input to the data analysis system. The natural language input, such as text input, audio input, and the like, is processed by the data question and answer module, which determines a data question to be "What is the revenue for Q1 2023?". The data question and answer module identifies a context (e.g., an intent) of the data question using rule-based techniques, machine-learning techniques, or a combination thereof. In identifying the context, the data question and answer module determines whether the context has a quantitative intent, e.g., the data question is related to a numerical result that is derivable from a data set. The quantitative intent is classified by the data question and answer module based on information implied or stated in the data question. Non-limiting examples of quantitative intents include requests for computing a numeric total, a numeric comparison, a numeric difference, a numeric mean, a numeric minimum, a numeric maximum, or other derivable result from querying a data set. In at least one aspect, the intent is classified as being out-of-scope in response to determining the data question is not answerable as a numerical result from querying the data set. In such a scenario, the data question and answer module responds to the query with an output displayed in the user interface to indicate the data question is invalid. From the data question posed in this scenario (e.g., "What is the revenue for Q1 2023?"), the data question and answer module, for instance, determines the quantitative intent to be obtaining a numeric total from the data set.

Based on the quantitative intent, the data question and answer module generates a data query for querying the data set to compute a quantitative answer (e.g., a numeric total) to the data question. As one example, the data query is generated by further inferring attributes (e.g., a metric, a time range, other dimension) associated with the data question. The metric, time range, and/or other dimension are used to populate data fields or parameters of the data query for obtaining a quantitative answer based on the data set, which satisfies the quantitative intent. In continuing with the above example, the data question and answer module generates a data query for answering the data question posed in this scenario by using "revenue" in a metric field of the data query, by populating a time range field of the data query with a data range of "Jan. 1, 2023, to Mar. 31, 2023", and by using "total" as a value in an intent field of the data query.

The data set is queried with the data query to obtain a quantitative answer, which in this example is the total revenue accumulated in the first quarter of the year 2023. In one or more examples, the data set is queried directly by the data question and answer module, e.g., by inputting the data query into a data reporting service with access to the data set. The data question and answer module in other examples generates a prompt to a machine-learning model (e.g., a large language model) that is trained to query the data set directly, or indirectly by interacting with the data reporting service.

At this point, the result of the data query (i.e., the quantitative answer) is ready for inclusion in an output from the data question and answer module as a response to the natural language input. As one example, the data question and answer module causes the result "$10,024,482" to be displayed in a user interface. In one or more aspects, the result is converted to a natural language output that is displayed in the user interface. The machine-learning model of the data question and answer module, for instance, includes a large language model that converts the quantitative answer "$10,024,482" into a complete sentence formed using the attributes of the data query.

In at least one example, the machine-learning model is trained using template language to be used for conveying the answers. A training template indicates that the answer be formatted to express the quantitative intent, the metric, the time range, and/or other attributes associated with the data query. For instance, a template for the above example answer is input to the machine-learning model as: "The"+[quantitative intent]+[metric]+"for"+[time range]+"$"+[result], and the machine-learning model causes the data question and answer module to output the answer within in the user interface as "The total revenue for Q1 2023 is $10,024,482".

To improve the robustness of the answer provided by the result, the data question and answer module determines one or more additional data queries usable to derive auxiliary information from the data set, such as, for answering relevant follow-up questions that are anticipated, but not directly asked, from the natural language input. Additional data questions are, for instance, inferred by the machine-learning model based on the quantitative intent of the original query. In one or more examples, based on the answer, the data question, the quantitative intent, or a combination thereof, the data question and answer model configures the machine-learning model (e.g., a large language model) to generate additional data queries of the data set that return additional results (i.e., additional quantitative answers) to these anticipated follow-up questions. In continuing with the above example, when the data question is "What is the revenue for Q1 2023", the machine-learning model queries the data set based on the additional data queries to determine auxiliary information related or anticipated for data analysis based on the quantitative intent and/or the quantitative answer to the data question. As one example, the data set is queried to obtain auxiliary information including the total revenue for this year (e.g., 2023) and the total revenue for the prior year, e.g., 2022.

The data question and answer module generates auxiliary information that is relevant to queries based on data questions that is likely to be useful to a data analyst or other user requesting the answer, as a way to save them time in analyzing the data set. These answers to the additional data queries are output for display in the user interface with the displayed results. Displaying this auxiliary information with the original answer helps put the result in a greater context than the context of the specific question originally asked, which aids in efficiency in understanding the data set.

To further improve the robustness of the quantitative answer derived from the original data question inferred from the natural language input, the data question and answer model causes the large language model to generate an explanation about how the quantitative answer to the original data question and the auxiliary information that answers the anticipated follow-up questions is derived. In at least one example, the explanation is output in the user interface in response to a user input that requests the explanation. In at least one other example, the explanation is output automatically after the answer, after the auxiliary information, or interspersed with the display of the answer and the auxiliary information.

There are many different ways to generate an explanation that indicates how the answer, and the auxiliary information is computed. In one or more variations, the explanation includes text indicating the actual data query and the additional data queries generated from the original query. As another way to provide the explanation, the data question and answer module trains the machine-learning model to present the explanation as a natural language response, including a text response and/or graphical response based on templates. A textual explanation template, for instance, is used to train the machine-learning model to indicate natural language the model is to use to explain how the answer and the auxiliary information is computed. The templates include fields populated by the machine-learning model with portions of the answer, the additional answers, the data query, the data question, and the like.

Answering questions of data drives business insights, knowledge, and decisions. Yet, the process of interactions by a human to obtain answers through sequential data question queries reduces efficiency and effectiveness. The auxiliary information and the explanations alleviates these problems by giving the answer to the original question, in addition to providing relevant, auxiliary information related to the original question, followed by an explanation for the human to learn to increase confidence in answers provided by the data analysis system. While conventional data analysis techniques are tedious and time consuming, the data question and answer module configures the data analysis system to answer data questions efficiently (e.g., with fewer user inputs) by deriving satisfactory answers that are supported by explanations and additional context from the data set to increase confidence in the results.

Term Examples

A "machine-learning model" refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

A "large language model" (LLM) is a type of machine-learning model that is designed to understand, generate, and interact with human language inputs at a large scale. These machine-learning models are trained on vast amounts of text data using deep learning techniques (e.g., neural networks) to learn patterns, nuances, and the structure of language. The use of the term "large" refers to both the size of the training data and also to the complexity and scale of the neural networks, which may include billions or even trillions of parameters.

Large language models are configurable to perform a wide range of language-related tasks without being explicitly programmed for each one. Examples of these tasks include text generation, translation, summarization, question answering, sentiment analysis, and natural language processing. To train a large language model, the underlying machine-learning model is provided with training data that includes examples of text to train and retrain the model to predict a next word in a sequence. Over time, the model, once trained, is configured to generate text that is coherent and contextually relevant, is configurable to mimic a style and content of the training data, and so forth. In this way, large language models provide a foundational tool in artificial intelligence for understanding and generating human language, powering a wide range of applications from conversational agents to content creation tools.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Data Question Answering Environment

FIG. 1 is an illustration of a digital medium environment 100 in an example implementation that is operable to employ data question techniques including answering with auxiliary recommendations as described herein. The illustrated environment 100 includes a data system 102 and a computing device 104 that are communicatively coupled, one to another, via a network 106.

The data system 102 and the computing device 104 are example computing devices that are configurable in a variety of ways. A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources, e.g., mobile devices. Additionally, although separate, individual computing devices are shown and described in instances in the following discussion, each computing device is also representative of a plurality of different devices, such as multiple servers utilized by a business to perform operations "over the cloud" and as further described in relation to FIG. 8.

The data system 102 includes a data service manager module 108 that is implemented using hardware and software resources (e.g., a processing device and computer-readable storage medium) of the data system 102 in support one or more data reporting services 110. The data reporting services 110 are made available, remotely, via the network 106 to computing devices (e.g., computing device 104) to enable querying a data set 114 maintained by a storage device 112.

Although, in this illustrated example, the storage device 112 is maintained locally at the data system 102, in other examples, the computing device 104 includes the storage device 112 to maintain the data set 114 locally at the computing device 104. When the data set 114 is maintained locally at the computing device 104, aspects of the data system 102 (e.g., the data service manager module 108, the data reporting services 110) are integrated within the computing device 104 to enable hardware and software resources on the computing device 104 to access the data set 114. The data set 114, for instance, is configurable as a knowledge source (e.g., using webpages, digital documents, digital audio, digital video, digital images, and so forth) that is accessible via a variety of entities, examples of which include databases, third-party systems, and so forth.

The data reporting services 110 are scalable through implementation by the hardware and software resources of the data system 102 to support a variety of functionalities, including data accessibility, data verification, real-time data processing, data analytics, and so forth. Examples of the data reporting services 110 include a data aggregation service, a data storage service, a data management service, a data analytics service, a project management service, a business management service, an accounting service, and so on.

Accordingly, in the illustrated example, access from the computing device 104 to the data reporting services 110 is utilized by a data analysis system 116 of the computing device 104. A data question and answer module 118 (e.g., application, browser, network-enabled application, and so on) of the data analysis system 116 accesses the data set 114 using the one or more data reporting services 110. The data question and answer module 118, for instance, causes the computing device 104 to send a data query over the network 106 to an interface with the data service manager module 108 when the data reporting services 110 are implemented remotely. In another example, when the data reporting services 110 are implemented locally, the data question and answer module 118 causes the computing device 104 to input the data query directly within the data service manager module 108.

The data reporting services 110 are configured to perform a function based on the data query, such as to compute a quantitative answer or produce a numeric response from the data set 114. A result generated by the data reporting services 110 based on querying the data set 114 is output from the data service manager module 108. In one example, the result is output to the computing device 104 via the network 106. When the data reporting services 110 are implemented locally on the computing device 104, the data service manager module 108 outputs the result directly to the data question and answer module 118, such as over an internal communication channel the data analysis system 116.

The data question and answer module 118 is configurable to receive an input 120 (e.g., a natural language user input, a machine-generated input) that includes a query 122. Based on the query 122, the data question and answer module 118 generates an output 124 (e.g., for display in a user interface 126) from the data analysis system 116. The output 124 includes an answer 128 to the query 122, one or more additional answers 130 to the query 122, and an explanation 132 for indicating how the data question and answer module 118 determined the answer 128 and the additional answers 130. As illustrated, the user interface 126 is displayed on a display device 134 of the computing device 104, and within the user interface 126, the query 122, the answer 128, the additional answer 130, and the explanation 132 are displayed as textual information, e.g., natural language responses. The user interface 126 is a graphical user interface in the illustrated example. In other examples, the user interface 126 is output as another type of user interface (e.g., an audible user interface through an audio output device, a haptic user interface through a haptic feedback device) or a combination of multiple user interface types and output devices.

As previously described, conventional techniques generate a single answer to a query that omits additional information relevant to interpreting the answer. In one or more examples, querying the data set 114 using these conventional techniques to generate a single answer to a query is inefficient. Additional user inputs are likely to be received to perform additional queries on the data set 114, which is tedious and time consuming.

Accordingly, in the techniques described herein, the data question and answer module 118 is configured to generate a robust answer to a data question inferred from the query 122. The answer 128, as well as the explanation 132 and the additional answers 130 are output in response to the query 122 to instill confidence in the answer 128 and preempt receiving additional user inputs. The data question and answer module 118, for instance, is configurable to receive the query 122 as a natural language input from a user of the data analysis system 116. The data question and answer module 118 applies rule-based techniques to the query 122, applies machine-learning techniques to the query 122, or uses a combination of rule-based and machine-learning techniques to determine the context of the query 122. Based on the context and one or more dimensions of the query 122, a data query is generated for querying the data set 114 using the data reporting services 110. For example, the data question and answer module 118 infers a quantitative intent of the query 122 to be a data question to request a numeric total derivable from the data set 114.

The machine-learning model is trained to determine one or more additional queries based on the context of the query 122. Based on the context and the data query, the machine-learning model, for instance, is trained to output additional data queries for querying the data set 114 using the data reporting services 110. In response to querying the data set 114, the machine-learning model generates a result as the output 124 from the data question and answer model 118. The result included in the output 124 includes the answer 128 as a quantitative answer to the query 122, the additional answers 130 based on the additional queries, and the explanation 132 indicating how the machine-learning model generated the answer 128 and/or the additional answers 130 in response to the querying of the data set 114. By doing so, the data question and answer module 118 is configured to generate the output 124 as a robust answer to a data question inferred from the query 122. The data question and answer module 118 improves efficiency (e.g., receives fewer inputs) in performing data analysis tasks based on the data set 114, which is not possible in conventional techniques. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Machine-Learning Assisted Data Question Answering

The following discussion describes data question answering and auxiliary recommendation techniques for machine-learning model based data analysis systems that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks.

Figure 7:
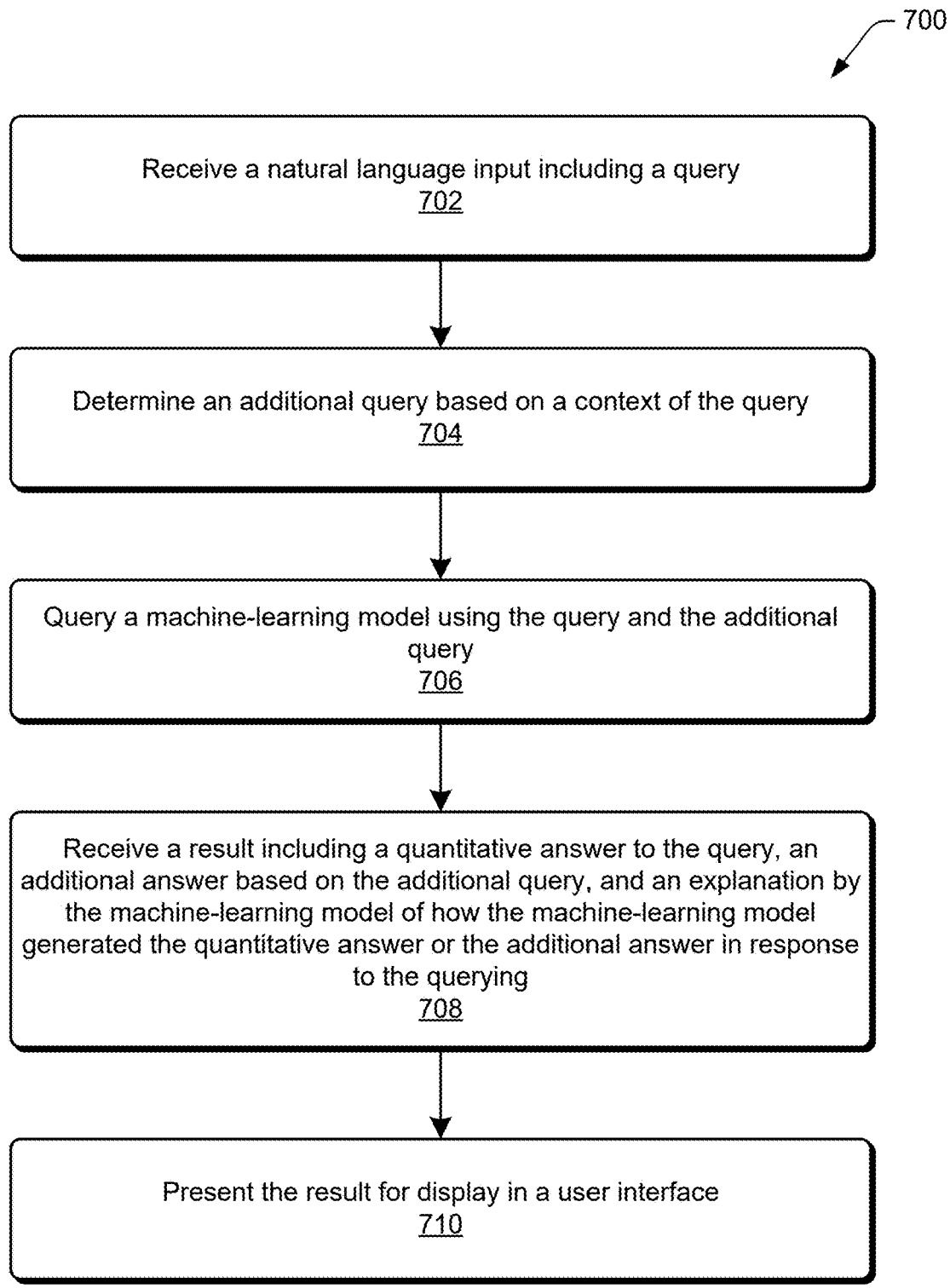

Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm. FIG. 7 is a flow diagram depicting an algorithm 700 as a step-by-step procedure in an example implementation of operations performable for accomplishing a result of machine-learning model based data question answering and auxiliary recommendation techniques. In portions of the following discussion, reference will be made in parallel with FIG. 7.

Figure 2:
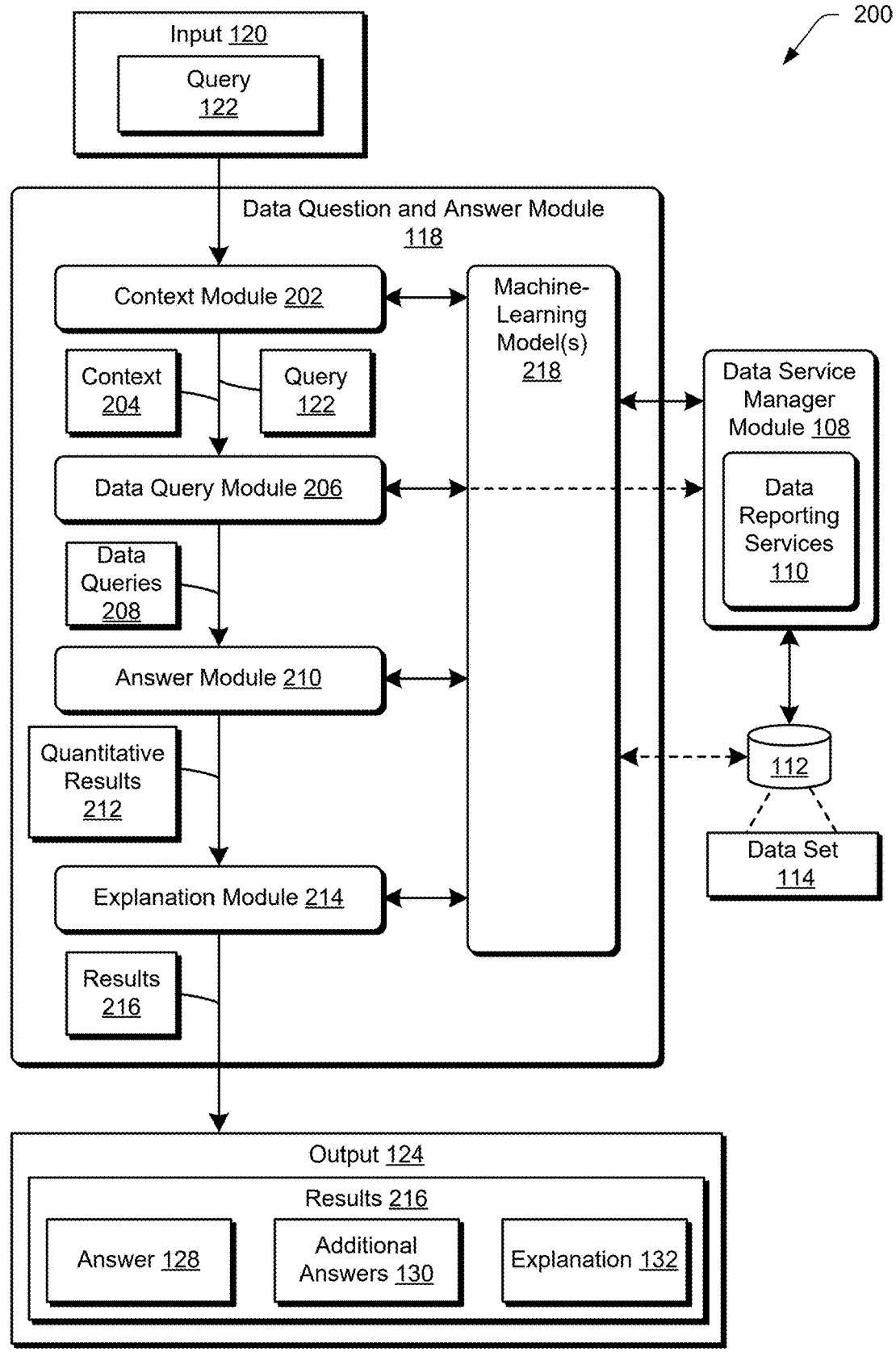
FIG. 2 depicts an example implementation of a data question and answer module of FIG. 1 in greater detail as employing techniques described herein for data question answering with auxiliary recommendations.
Figure 3:
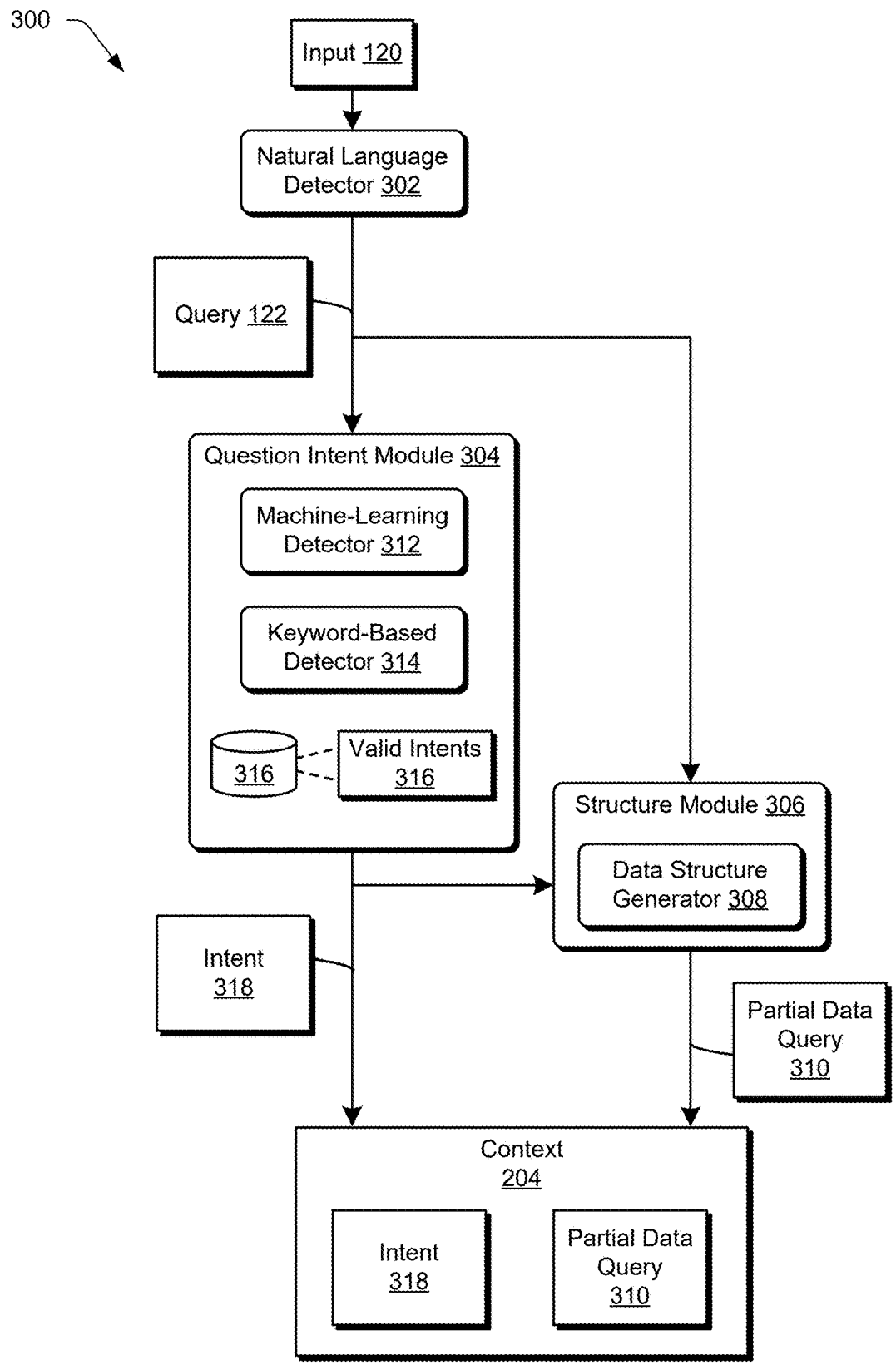
FIG. 3 depicts an example implementation of a context module of FIG. 2 in greater detail as employing techniques described herein for determining a context of a query from a natural language input.

FIG. 2 depicts an example implementation 200 of a data question and answer module 118 of FIG. 1 in greater detail as employing techniques described herein for data question answering with auxiliary recommendations. To begin in this example, a context module 202 of the data question and answer module 118 receives the input 120 including the query 122 (block 702). Generally, the context module 202 is operable to determine a context 204 based on the query 122 and output the context 204 and the query 122 to a data query module 206 of the data question and answer module 118. The input 120, for instance, represents a natural language text, voice, or video input containing a data question representing the query 122. In one or more aspects, the query 122 contained in the natural language of the input 120 is received (e.g., via the user interface 126) from a prompt interface to one or more machine-learning models 218 of the data question and answer module 118. The context module 202, in one or more implementations, shares an interface with the machine-learning models 218 and receives the context 204 inferred based on machine-learning techniques applied to the query 122. In another example, the context module 202 applies rule-based techniques to derive the context 204 of the query 122 or uses a combination of rule-based and machine-learning techniques to determine the context 204 of the query 122. Details of the context module 202 are illustrated in FIG. 3. The context 204 sets the stage for determining a set data questions that are inferable from the query 122. By understanding the context 204, the data question and answer module 118 is operable to return results based on the query 122 and further based on the set of data questions, which improves efficiency in analyzing the data set 114.

The data query module 206 determines at least one additional query based on the context 204 of the query 122 (block 704). Details of data query module 206 are illustrated in FIG. 3. In general, the data query module 206 is configured to output the data query determined for answering the data question inferred from the query 122 as well as one or more additional data queries for generating answers to additional data questions related to the original query 122. The data queries 208 are output from the data query module 206 to an answer module 210 of the data question and answer module 118. The data query module 206 generates data queries 208 including this additional query determined based on the context 204 as well as a data query generated based on the query 122 and the context 204. In the illustrated example of FIG. 2, the data query module 206 determines a data query for obtaining an answer from the data set 114 to a data question inferred from the query 122. The data queries 208 are compatible for performing operations with the data reporting services 110, for instance. In one or more examples, the data queries 208 include natural language queries processed by the machine-learning model 218 into a format that is conducive with the data reporting services 110. In another variation, the data queries 208 are not in a natural language format, but in a hybrid machine-human understandable format to be processed by the data reporting services 110.

Figure 5:
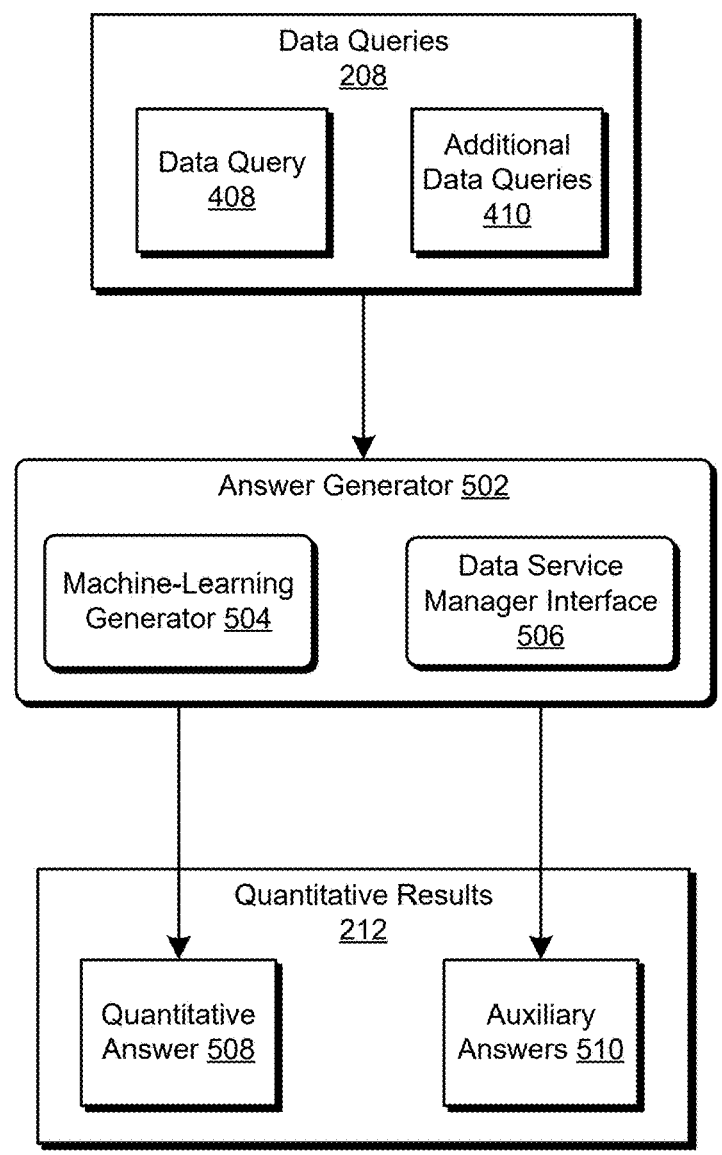
FIG. 5 depicts an example implementation of an answer module of FIG. 2 in greater detail as employing techniques described herein for determining quantitative results from querying a data set based on data queries determined from a natural language input.

The answer module 210 receives the data queries 208 and in response, queries the data set 114 based on the data queries 208. Details of the answer module 210 are illustrated in FIG. 5. In general, the answer module 210 is configured to cause the data reporting services 110 to query the data set 114 based on the data queries 208. As one example, the answer module 210 inputs the data queries 208 to the machine-learning model 218. The machine-learning model 218 shares an interface with the data service manager module 108, from which the data reporting services 110 are commanded by the machine-learning model 218 to query the data set 114 using the data queries 208 based on the query 122 and the additional query (block 706). The answer module 210 receives quantitative results 212 in response to each of the data queries 208 being queried using the machine-learning model 218. In one or more variations, the machine-learning model 218 is trained or re-trained based on the data set 114 to respond directly to the data queries 208 with quantitative results 212 that answer the data queries 208. In at least one other variation, the machine-learning model 218 is trained or re-trained based on information provided by the data service manager module 108 and/or the data reporting services 110 on how to communicate with the data reporting services 110 to query the data set 114 and respond to the data queries 208 with quantitative results 212 that answer the data queries 208. For example, an application programming interface to the data reporting services 110 is used to obtain training data for configuring the machine-learning model 218 to be able to query the data set 214 managed by the data service manager module 108. The quantitative results 212 are output from the answer module 210 to an explanation module 214 of the data question and answer module 118.

Next in this illustrated example, the explanation module 214 receives the quantitative results 212 sent from the answer module 210. In general, the explanation module 214 interfaces (e.g., communicates) with the machine-learning model 218 to derive an explanation by the machine-learning model 218 of how the machine-learning model 218 generated the quantitative results 212 in response to the querying. Details of the explanation module 214 are illustrated in FIGS. 6-1 through 6-8. As one example, the machine-learning model 218 is prompted by the explanation module 214 to generate natural language answers to the data queries 208, which include the quantitative results 212 formatted into a human understandable format for presentation in the user interface 126. In at least one aspect, the machine-learning model 218 is trained based on template responses provided by the explanation module 214 to the machine-learning model 218 to enable the machine-learning model 218 to learn a format or style for the answers and the explanation provided in response to the query 122 originally received from the input 120.

Continuing with this depicted example, the data question and answer module 118 outputs results 216 generated in response to the query 122. The results 216 are received from the explanation module 214, which include an answer 128 (e.g., quantitative answer, natural language based answer) to the data query inferred from the query 122, one or more additional answers 130 (e.g., quantitative answer, natural language based answer) based on at least one of the data queries 208 determined in addition to the data query based directly on the query 122, and an explanation 132 generated by the machine-learning model 218 to indicate how the machine-learning model 218 generated the answer 128 or the additional answers 130 in response to the querying (block 708). In one or more examples, the explanation 132 is a natural language explanation (e.g., generated by an LLM of the machine-learning model 218, generated from a template) and in at least one variation, the explanation 132 reveals the data queries 208 generated to answer the query 122, which may be useful for more expert users to gain confidence in the results 216.

To finish this example depicted in FIG. 2, the results 216 are presented for display in the user interface 126 (block 710). For example, as illustrated in FIG. 1, the user interface 126 is output by the computing device 104 for display using the display device 134. Within the user interface 126, the display device 134 presents text of the query 122, the answer 128, the additional answer 130, and the explanation 132. In one or more examples, the user interface 126 presents other forms of the results 216 to convey information associated with the answer 128, the additional answer 130, and the explanation 132. The results 216 include, in at least one variation, one or more graphical indications of the quantitative answer 128 to the query 122, the additional answer 130 based on the additional query, and the explanation 132. As one example, a graph, a chart, an image, a video, or other graphical indication is used to convey a response to the query 122.

With the results 216 that are included in the output 124, the data question and answer module 118 is configured to answer a data question inferred from the query 122, at the same time the data question and answer module 118 answers other anticipated data questions. This contrasts with conventional systems that cannot answer more than one data question at a time. The data question and answer module 118 allows a user query the data set 114 efficiently and with confidence given the explanation 132 and auxiliary recommendations provided as the additional answers 130. The auxiliary information contained in the additional answers 130, for instance, improves accuracy and effectiveness of data analysis performed on the data set 114 by providing answers that are one or more steps ahead of the user input 120.

For clarity and ease of description, the techniques for data question answering with auxiliary recommendations are described throughout this disclosure as enabling efficient querying of data sets for answers to individual data questions received from a natural language input. However, the techniques also apply to situations where the natural language input includes multiple data questions including but not limited to compound questions. The algorithm 700 is configurable, for instance, to process multiple queries derived from multiple data questions received from a single natural language input. Adaptations of the algorithm 700 are possible to improve efficiency when processing multiple data questions. Aspects of the algorithm 700 are executable in parallel or nearly the same time to improve efficiency. If two or more of the multiple data questions have dependencies on one another, then some aspects of the algorithm 700 are performed sequentially, one after another. In this regard, the data question and answer module 118 executes steps of the algorithm 700 sequentially, in-parallel, or a combination thereof, e.g., partially in-parallel.

In at least one variation of the above example, the query 122 includes a plurality of different queries received from the natural language of the input 120. Imagine the natural language of the input 120 includes multiple data questions, e.g., "What is the total revenue for Q1 and how does it compare to the average Q1 revenue over the past five years?". The data question and answer module 118 processes the input 120 to generate the query 122 as including a first query for a first data question, e.g., "What is the total revenue for Q1", and a second query for a second data question, e.g., "How does it compare to the average Q1 revenue for the past five years".

The data question and answer module 118 processes the first and second query at least partially in parallel or sequentially depending on various factors. As one example, if a quantitative answer to the second query depends on a quantitative answer to the first query, then the data question and answer module 118 executes operations to determine the first quantitative answer prior to executing operations for determining the second quantitative answer. In one or more examples, the data question and answer module 118 improves efficiency by at least partially processing multiple queries in parallel. The data question and answer module 118, for instance, causes the context module 202 to determine the context 204 of the query 122 by simultaneously determining a respective context of the first query, such as a numeric total, and a respective context the second query, e.g., a comparison between an average and a numeric total. In various examples, the respective contexts of two different queries are different, similar, or the same. To further improve efficiency, the data question and answer module 118 causes the data query module 206 to simultaneously determine the data queries 208 for each of the first and second queries. The data queries 208, for instance, include a first data query for the first query and at least one respective additional data query that is determined for the first query based on the respective context of the first query. In addition, the data queries 208 include a second data query for the second query and at least one respective additional query is determined for the second query based on the respective context of the second query.

In at least one example, the answer module 210 generates the quantitative results 212 of the data queries 208 by sequentially obtaining a respective quantitative answer for each of the two queries received in the input 120, one at a time. In at least one other example, the respective quantitative answer for each of the different queries is determined in parallel by sending the data queries 208 to the machine-learning model 218 as a single input. In response to the single input, the quantitative results 212 of querying the data set 114 based on the data queries 208 generated for the first and second queries is received as a single output from the machine-learning model 218. Lastly in this example, the explanation module 214 generates the answer 128, the additional answers 130, and the explanation 132 for each of the two queries. For example, the output 124 displayed in the user interface 126 includes a respective quantitative answer determined for the first query, a respective quantitative answer determined for the second query, a respective additional answer for the respective additional query determined for the first query, a respective additional answer for the respective additional query determined for the second query, and an explanation by the machine-learning model 218 of how the machine-learning model 218 generated the respective quantitative answer for the two queries or the respective additional answer for the two queries.

FIG. 3 depicts an example implementation 300 of the context module 202 of FIG. 2 in greater detail as employing techniques described herein for determining the context 204 of the query 122 from the input 120. In the implementation 300 depicted, the context module 202 includes a natural language detector 302, a question intent module 304, and a structure module 306.

The natural language detector 302 receives the input 120 and interprets (e.g., using natural language processing techniques) the query 122 to identify a data question about the data set 114. The natural language detector 302 in variations receives text input, audio input, video input, or other types of input to process the input 120 and determine a plainly stated question about the data set 114, which is output as the query 122.

The question intent module 304 is operable to detect whether an intent of the query 122 is one of a plurality of valid intents 316. The question intent module 304 is operable to output an intent 318 determined from one of the valid intents 316. The intent 318 represents a quantitative intent selected from one of the plurality of the valid intents 316 for data questions related to the data set 114. For example, the valid intents 316 for data questions about the data set 114 accessible through the data reporting services 110 include examples of quantitative intents that return numeric results of computations performed on the data set 114. Numerous examples of the valid intents 316 exists. Some non-limiting examples of the valid intents 316 include: a quantitative total, a quantitative comparison, a quantitative difference, a quantitative mean or average, a quantitative minimum, a quantitative maximum, and so forth. In response to determining that none of the valid intents 316 is inferable from the query 122, the intent 318 output from the question intent module 304 indicates an out-of-scope intent, and the system includes information in the results 216 (e.g., the answer 128) to indicate the query 122 detected from the input 120 is out-of-scope and unanswerable by the data question and answer module 118.

In at least one example, the question intent module 304 leverages a combination of rule-based and machine-learning based intent detectors to predict the context 204 of the query 122 efficiently and accurately. In at least one other variation, the question intent module 304 relies on either a rule-based detector or a machine-learning based detector, alone. In a hybrid approach where rule-based and machine-learning based detectors are used in combination, the question intent module 304 executes more efficiently than other individual rule-based detector or individual machine-learning based detector approaches.

A keyword-based detector 314 of the question intent module 304 is configured to apply one or more rules to keywords present in the data question included in the query 122 to determine the intent 318. For example, the query 122 includes a data question "What is the total revenue for Q1 2023?", and the keyword-based detector 314 correlates the word "total" with one of the valid intents 316 associated with a quantitative intent. The intent 318 is set to a value indicating the quantitative intent of the query 122 is a quantitative total.

A machine-learning detector 312 of the question intent module 304 is trained to identify the intent 318 as part of inferring the context 204 of a data question associated with the query 122 that is extracted by the natural language detector 302 from the natural language content of the input 120. As one example, the machine-learning detector 312 includes an interface to the machine-learning model 218. The machine-learning detector 312 inputs the valid intents 316 and the query 122 to the machine-learning model 218 via this interface. In response, the machine-learning detector 312 receives the intent 318 derived by the machine-learning model 218 over the shared interface and outputs the intent 318 for inclusion in the context 204. For example, with the query 122 including a data question "What is the revenue for Q1 2023?", the keyword-based detector 314 is unable to correlate words in the query 122 with one of the valid intents 316. The machine-learning detector 312, however, infers that "total" is implied by the language context included in the query 122. That is, although total is not expressly stated, the machine-learning detector 312 performs word prediction techniques to infer that the intent is for a "total" to be computed for the revenue in the specified time range.

In at least one variation, the machine-learning detector 312 validates or corrects the intent 318 determined by the keyword-based detector 314. The machine-learning detector 312 is operable to overrule the intent 318 derived using keywords, for instance, if the key-word detector determines the intent 318 to be out-of-scope and not one of the valid intents 316. The intent 318 is set to a value indicating the quantitative intent of the query 122, which in the examples above indicate the intent 318 is quantitative total.

The structure module 306 is operable to format the query 122 into a partial data query 310 for use in creating complete queries and additional queries (e.g., the data queries 208) for querying the data set 114 based on the data question and the intent 318. As depicted in the implementation 300, the structure module 306 includes a data structure generator 308. The data structure generator 308 populates a portion of fields of a JSON data structure, for instance, which is compatible with an input format to the data reporting services 110. The data structure (e.g., the JSON) includes fields associated with an intent, metrics, time ranges, data ranges, and other attributes and dimensions of the query 122. The data structure generator 308 matches keywords present in the query 122 with numerical and/or non-numerical attributes, time ranges, filters, and other dimensions to begin constructing the data queries 208. The data structure generator 308, for instance, outputs the partial data query 310 as a partially completed JSON including an intent attribute corresponding to "total", a metric attribute corresponding to "revenue", a time range attribute corresponding to "Jan. 1, 2023, through Mar. 31, 2023", and so forth. The context 204 determined by the context module 202 is output to the data query module 206, including the intent 318 embedded within or included separate from the partial data query 310.

Figures 1, 4:
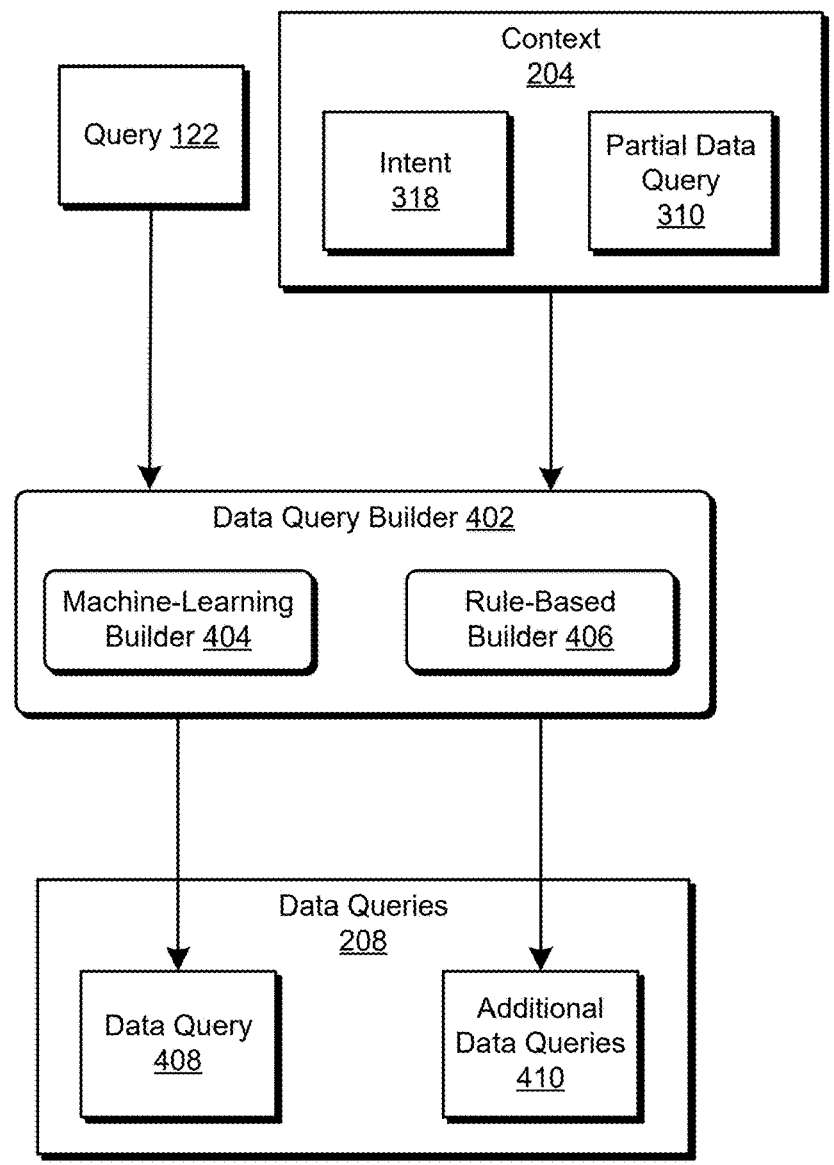

FIG. 4-1 depicts an example implementation 400 of the data query module 206 of FIG. 2 in greater detail as employing techniques described herein for determining the data queries 208 based on the context 204 of the query 122 determined from the input 120. In the implementation 400 depicted, the data query module 206 includes a data query builder 402. The data query builder 402 receives the query 122 and the context 204 as inputs from which the data queries 208 are generated by the data query builder 402 as outputs. The data queries 208 include a data query 408 directly related to the query 122, and one or more additional data queries 410 configured to determine auxiliary information or auxiliary recommendations associated with the query 122 and/or the data query 408. The operations performed by the data query builder 402 include formatting content of the query 122 into parameters or attributes of the data query 408. Configuring the data query 408 based on the query 122 enables querying of the data set 414 based on the data question (e.g., indicated in the partial data query 310) and the intent 318. In one or more examples, the data query builder 402 populates attributes of a data structure based on the query 122 including the data question and the intent 318. Empty fields of the partial data query 310 (e.g., a JSON data structure created by the context module 202) are filled with variables inferred by the data query builder 402 using a machine-learning approach, a rules-based approach, or a combination of rules and machine-learning. Populating the empty fields of the partial data query 310 enable the data query builder 402 to construct the data query 408 based on the attributes populated within the data structure. For example, an intent attribute of the JSON data structure created by the context module 202 is populated by the intent 318. One or more metric attributes and dimension attributes are populated by respective parameters derived from the query 122, which vary depending on a data type associated with the data set 114 and an application program interface defined by the data reporting services 110 used to manage the data set 114. As some non-limiting examples, metrics of financial data within the data set 114 include revenue, profits, losses, expenses, taxes, and so forth. Metrics of inventory data in the data set 114 include, for instance, parts inventory, material inventory, tool inventory, production inventory, purchase orders, order fulfillments, order receipts, etc. Various other metrics of business data, scientific data, engineering data, government data, commercial data, and the like are possible in other examples. Likewise, variations in the dimension attributes occur based on differences in types of data maintained in the data set 114. Non limiting examples of dimension attributes include a data range attribute, a geography attribute (e.g., a location), a time range attribute, a category attribute, and the like.

In at least one example, the data query builder 402 leverages a machine-learning builder 404, a rule-based builder 406, or a combination thereof to generate the data query 408 and the additional data queries 410. As one example, the rule-based builder 406 uses the query 122 the partial data query 310, and the intent 318 to generate the data query 408 to include a complete set of attributes defined by an application program interface to the data service manager module 108 and/or the data reporting services 110. The rule-based builder 406 completes attributes, metrics, and/or dimensions for the data query 408 that are incomplete in the partial data query 310.

Next, in this particular example, the data query builder 402 relies on the machine-learning builder 404 to generate the additional data queries 410 for querying the data set 114 based on the query 122, the intent 318, and/or the data query 408. The machine-learning builder 404 maintains an interface with the machine-learning model 218 to request the additional data queries 410 be automatically generated using machine-learning. Based on inputs received over the interface shared with the machine-learning builder 404, the machine-learning model 218 infers the additional data queries 410, which once queried, are configured to answer additional data questions related to the input 120. In at least one example, the data query builder 402 adopts this hybrid approach of using a combination of rule-based and machine-learning based builders to improve efficiency. In another example, the data query builder 402 generates the data queries 208 using one approach, over the other.

FIG. 4-2 depicts example pseudo source code executed by the implementation 400 of the data query module 206 depicted in FIG. 4-1 to determine the data queries 208. For example, pseudo code portion 412 indicates a first query (i), a second query (ii), and auxiliary information (iii) derived from querying the data set 114 based on the first and second queries (i and ii). The pseudo code portion 412 is conditioned by the time range attribute. In this example, execution by the data query builder 402 of the pseudo code portion 412 is conditioned by the time range attribute, e.g., the time range attribute being equal to one month. Additional pseudo code portions 414, 416, and 418 are executed by the data query builder 402 depending on whether the time range attribute satisfies other conditions.

FIG. 5 depicts an example implementation 500 of the answer module 210 of FIG. 2 in greater detail as employing techniques described herein for determining the quantitative results 212 from querying the data set 114 based on the data queries 208 determined from the input 120. The answer module 210 depicted in FIG. 2 includes an answer generator 502, which has a machine-learning generator 504 and a data service manager interface 506 that communicatively couples the answer module 210 to the data service manager module 108.

The answer generator 502 receives the data queries 208 (e.g., the data query 408 and the additional data queries 410) as inputs. In response to querying the data set 114 based on the data query 408, the answer generator 502 receives a quantitative answer to the data query 408 for answering a data question posed in the query 122. In response to querying the data set 114 based on the additional data queries 410, the answer generator 502 receives a quantitative answer to each of the additional data queries 410 for answering additional data questions that provide auxiliary recommendations or the additional answers 130, which support the quantitative answer of the query 122. The answer generator 502 outputs the quantitative answers to the data query 408 and the additional data queries 410 the quantitative results 212. A quantitative answer 508 in the quantitative results 212 corresponds to the quantitative results 212 associated with querying the data query 408 against the data set 114. The quantitative answer 508 represents an answer to a data question inferred from the input 120 and the query 122. Auxiliary answers 510 in the quantitative results 212 correspond to the quantitative results 212 obtained in response to querying the data set 114 based on the additional data queries 410. The auxiliary answers 510 are quantitative answers each representing an answer to an additional data question inferred from the context 204, the input 120, the query 122, and so forth.

In at least one example, the answer generator 502 uses the machine-learning model 218 to query the data set 114 based on the data queries 208. The answer generator 502, for instance, leverages the machine-learning generator 504 to query the data set 114 by interacting with the data service manager module 108 or by querying the data set 114 directly to answer the data queries 208. The data queries 208 in at least one aspect are input to the machine-learning generator 504, which provides an interface to the machine-learning model 218 for receiving queries to query the data set 114 directly. The machine-learning model 218 determines the quantitative results 212 in another aspect by sending query requests to the data reporting services 110 for obtaining the quantitative results 212 as answers to the data queries 208.

In one or more examples, the answer generator 502 uses the data service manager interface 506 to send query requests to the data reporting services 110 for obtaining the quantitative results 212 as answers to the data queries 208. The data service manager interface 506, for instance, is configured to query the data set 114 by inputting the data queries 208 to the data reporting services 11, which query the data set 114 and return the quantitative results 212. No matter how the data set 114 is queried by the answer generator 502, an answer to the data query 408 and an auxiliary answer to the additional data queries 410 are received as the quantitative results 212.

Figures 1, 6:
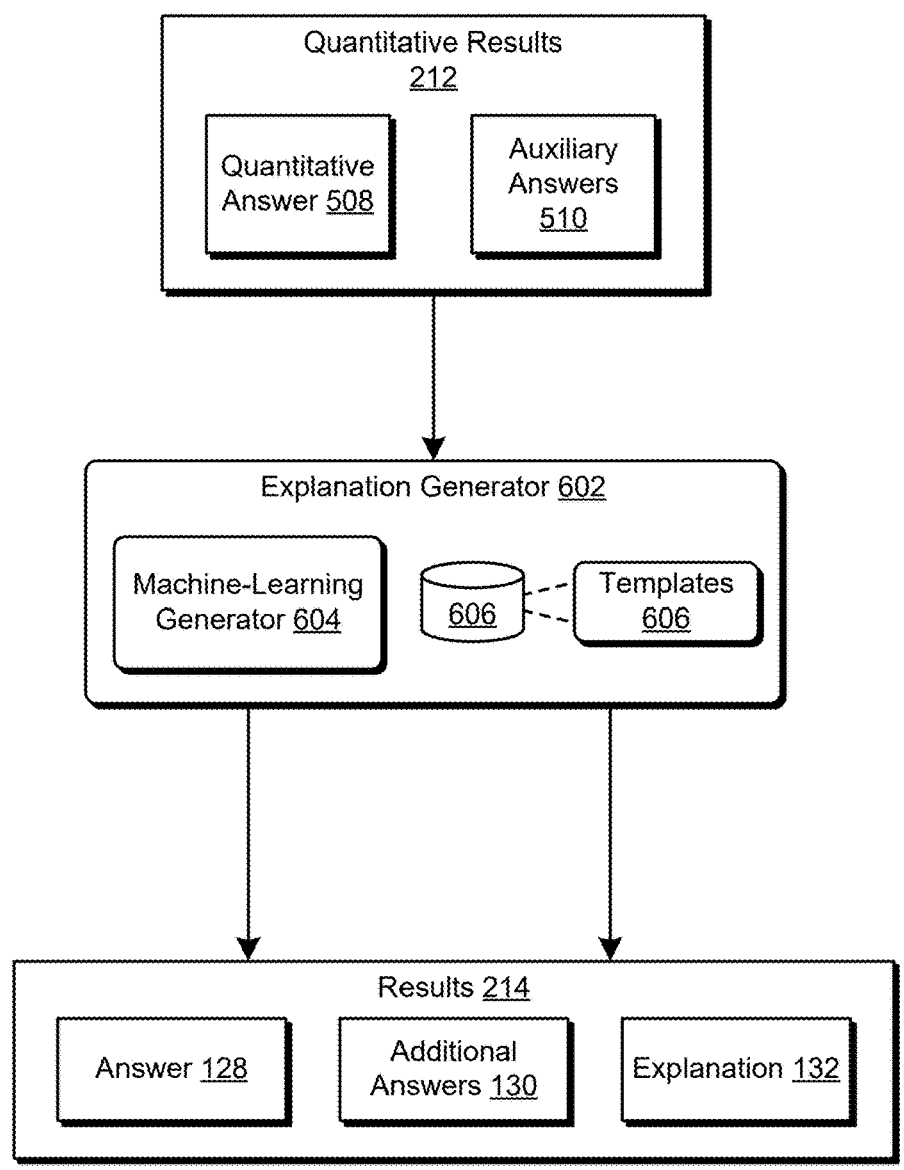

FIG. 6-1 depicts an example implementation 600 of the explanation module 214 of FIG. 2 in greater detail as employing techniques described herein for determining the results 216 of data question answering with auxiliary recommendations. The implementation 600 of the explanation module 214 illustrated in FIG. 2 includes an explanation generator 602, which has a machine-learning generator 604 and a plurality of templates 606. Examples of the templates 606 are illustrated in FIGS. 6-2 through 6-4. In one or more variations, the machine-learning generator 604 provides an interface to the machine-learning model 218 for inputting training data to cause the machine-learning model 218 to learn how to format the quantitative results 212 into the results 216 that include the answer 128, the additional answers 130, and the explanation 132. For example, based on one or more natural language answer templates included in the templates 606, the machine-learning generator 604 trains the machine-learning model to produce the answer 128 and the additional answer 130 as natural language responses for conveying the quantitative answer 508 and the auxiliary answers 510, respectively. Based on one or more natural language explanation templates included in the templates 606, the machine-learning generator 604 trains the machine-learning model 218 to produce the explanation as a natural language response for conveying how the machine-learning model 218 derived the quantitative answer 508 and the auxiliary answers 510.

Once the machine-learning model 218 is trained, the machine-learning generator 604 inputs the quantitative answer 508 and the auxiliary answers 510 to the machine-learning model 218 to request the answer 128 and the additional answers 130 to be generated in a natural language format. In addition, the machine-learning generator 604 inputs a request to the machine-learning model 218 to request the explanation 132 for conveying in a natural language format how the answer 128 and the additional answers 130 are generated. As one example, the explanation 132 indicates one or more of the attributes (e.g., intent, metrics, dimensions) used to construct the data queries 208 used to produce the quantitative results 212.

In one or more implementations, the explanation 132 is output for display in the user interface 126 in response to user input requesting the explanation 132. In other examples, the explanation 132 is output within the user interface 126 automatically, without user intervention. The explanation generator 602 is operable to use the machine-learning model 218 to generate the explanation 132 based on one or more of the data question derived from the query 122, the context 204 (e.g., the intent 318, the partial data query 310), the data queries 208 (e.g., the data query 408, the additional data queries 410), the additional data questions answered by the additional data queries 410, and the quantitative answer 508, and the additional quantitative answers shown as the auxiliary answers 510.

FIGS. 6-2 to 6-4 depict example answer and explanation templates utilized by the implementation 600 depicted in FIG. 6-1. The answer and explanation templates illustrated in FIGS. 6-2 through 6-4 are examples of the templates 606.

An answer template 608 is illustrated in FIG. 6-2. The answer template 608 is used to train the machine-learning model 218 to generate the answer 128 in a particular format determined by the context 204, e.g., the intent 318. For example, a table is input to the machine-learning model 218 including rows associated with different intents and corresponding formulas for concatenating the quantitative answer 508 and portions of the data query 408 into natural language responses.

An additional answer template 610 is illustrated in FIG. 6-3. The additional answer template 610 is used to train the machine-learning model 218 to generate the additional answers 130 in a particular format determined by the context 204 (e.g., the intent 318) and at least one attribute of the data queries 410 used to derive the additional answers 130. A table, for instance, is input to the machine-learning model 218 including rows associated with different intents and corresponding formulas for concatenating the auxiliary answers 510 with portions of the data queries 410 into natural language responses.

An explanation template 612 is illustrated in FIG. 6-4. The explanation template 612 is used to train the machine-learning model 218 to generate the explanation 132 in natural language format or other format that aids in understanding the answer 128 and the additional answers 130. The machine-learning model 218 receives an input of a table having rows associated with different intents and corresponding formulas for generating natural language responses based on concatenating the quantitative answer 508 with portions of the data query 408 and/or for concatenating the auxiliary answers 510 with portions of the data queries 410.

Figure 8:
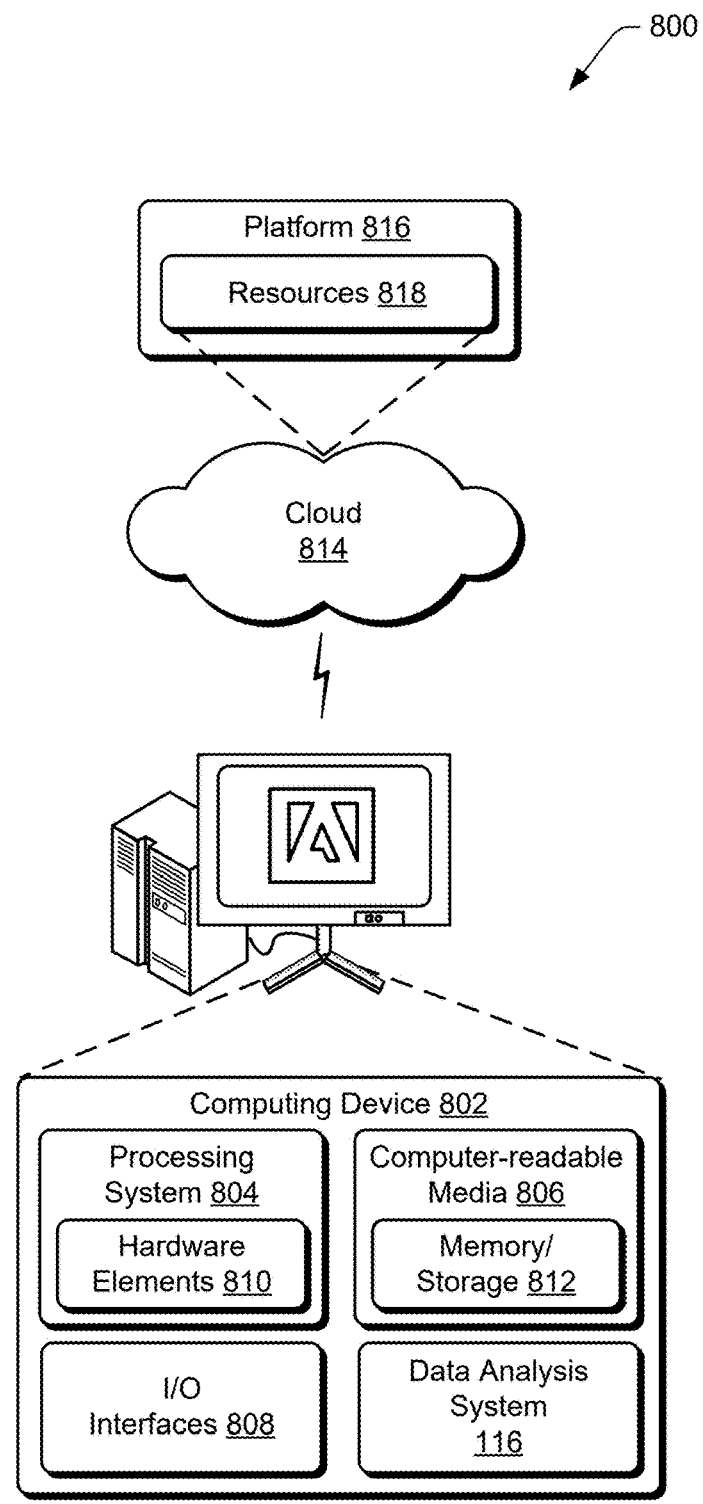

FIGS. 6-5 to 6-8 depict examples of the results 216 output from the implementation 600 depicted in FIG. 6-1. In one or more examples, the results 216 include the templates 606 used to generate one or more of the answer 128, the additional answers 130, and the explanation 132. FIG. 6-5 illustrates an example of the results 216 as results 614, FIG. 6-6 illustrates an example of the results 216 as results 616, FIG. 6-7 illustrates an example of the results 216 as results 618, and FIG. 6-8 illustrates an example of the results 216 as results 620. In each of the examples of the results depicted in FIGS. 6-5 through 6-8, a relevant part of the query 122 is presented in the user interface 126 including one or more metrics and the time ranges used in the data queries 208 so that a user can verify the source of the results 216. In addition, the input 120 is rewritten and presented in the user interface 126 to replace the time range, the metrics, and dimensions mentioned in the input 120 with actual time ranges, metrics, and dimensions used to generate the data queries 208 and derive the answer 128 and the additional answer 130 from the data set 214. This level of detail in the explanation 132 is useful to expert users that are interested in obtaining details about how the machine-learning model 218 derived the results 216 from the data set 214.

Example System and Device

FIG. 8 illustrates an example system 800, generally, that includes an example computing device 802 that is representative of one or more computing systems and/or devices that implement the various techniques described herein. This is illustrated through inclusion of the data analysis system 116. The computing device 802 is configurable, for example, as a server of a service provider, a device associated with a client (e.g., a client device), an on-chip system, and/or any other suitable computing device or computing system.

The example computing device 802 as illustrated includes a processing device 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 804 is representative of functionality to perform one or more operations using hardware. Accordingly, the processing device 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed, or the processing mechanisms employed therein. For example, processors are configurable as semiconductor(s) and/or transistors (e.g., electronic integrated circuits (ICs)). In such a context, processor-executable instructions are electronically executable instructions.

The computer-readable storage media 806 is illustrated as including memory/storage 812 that stores instructions that are executable to cause the processing device 804 to perform operations. The computer-readable storage medium is configured for storing instructions that, responsive to execution by the processing device, causes the processing device to perform operations. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable, and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some examples to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing device 804. The instructions and/or functions are executable/operable by one or more articles of manufacture (for example, one or more computing devices 802 and/or processing devices 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device example, implementation of functionality described herein is distributable throughout the system 800. For example, the functionality is implementable in part on the computing device 802 as well as via the platform 816 that abstracts the functionality of the cloud 814.

In implementations, the platform 816 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by a processing device, a natural language input from a first interface to a machine-learning model including a query related to an external data set;
   determining, by the processing device, an additional query based on a context of the query;
   querying, by the processing device, the machine-learning model using the query and the additional query to obtain quantitative results from accessing the external data set through a second interface shared with the external data set;
   receiving, by the processing device from the machine-learning model, a result based on the quantitative results obtained from the second interface including a quantitative answer to the query, an additional answer based on the additional query, and an explanation by the machine-learning model of how the machine-learning model generated the quantitative answer or the additional answer in response to the querying; and
   presenting, by the processing device, the result for display in a user interface.

2. The method of claim 1, further comprising:
   identifying, by the processing device, the context of the query as a quantitative intent inferred from a data question based on and not expressly stated in the natural language input.

3. The method of claim 2, wherein the identifying includes:
   selecting the quantitative intent from one of a plurality of valid intents for data questions related to the external data set, the external data set including data types associated within the external data set based on corresponding attributes and metrics of each data type including category attributes.

4. The method of claim 2, wherein the identifying includes:
   applying one or more rules based approaches to keywords present in the data question to determine the quantitative intent.

5. The method of claim 2, wherein the first interface comprises a prompt interface configured to receive the query, and the second interface comprises an application program interface shared with a data reporting service that manages the external data set, and the querying includes:
   formatting the query into a data query for querying through the application program interface the external data set based on the data question and the quantitative intent;
   receiving, from the application program interface, a quantitative answer to the data question in response to querying the external data set based on the data query; and
   determining the quantitative answer to the query based on the quantitative answer to the data question.

6. The method of claim 5, wherein the formatting includes:
   populating attributes of a data structure specified by the application program interface based on the data question and the quantitative intent; and
   constructing the data query for input to the application program interface based on the attributes populated within the data structure.

7. The method of claim 6, wherein the data structure comprises a JSON type data structure, and the attributes include:
   an intent attribute of the JSON data structure populated by the quantitative intent; and
   one or more metric attributes and dimension attributes of the JSON data structure each populated by respective parameters derived from different portions of the data question.

8. The method of claim 7, wherein the one or more metric attributes and dimension attributes of the data structure include one or more of a geography attribute, a time range attribute, and a category attribute.

9. The method of claim 7, wherein the explanation indicates one or more of the intent attribute and the one or more metric attributes and dimension attributes used to construct the data query.

10. The method of claim 5, wherein the determining includes:
    generating the additional query to answer an additional data question based on one or more of the quantitative intent, the data query, the data question, and the quantitative answer to the query.

11. The method of claim 10, wherein the querying further includes:
    receiving an auxiliary answer to the additional data question by requesting the data reporting service to query the external data set based on the additional query; and
    determining the additional answer based on the auxiliary answer to the additional data question.

12. The method of claim 11, wherein the receiving further includes:
    using the machine-learning model to generate the explanation based on one or more of the data question, the quantitative intent, the data query, attributes specified by the application program interface based on the data question and the quantitative intent, the additional query, the additional data question, and the additional answer.

13. A system comprising:
    a data storage configured to maintain external data set; and
    a processing device communicatively coupled to the data storage to perform operations that include:
      receiving a natural language input from a first interface to a machine-learning model including a query based on the external data set;
      determining an additional query based on a context of the query;
      querying the machine-learning model using the query and the additional query to obtain quantitative results from accessing the external data set through a second interface shared with the external data set;
      responsive to querying the external data set, receiving, from the machine-learning model, a result based on the quantitative results obtained from the second interface including a quantitative answer to the query, an additional answer based on the additional query, and an explanation by the machine-learning model of how the machine-learning model generated the quantitative answer or the additional answer; and
      output the result for display in a user interface.

14. The system of claim 13, further comprising:
    training or retraining the machine-learning model to generate the quantitative answer and the additional answer based on natural language answer templates; and
    training or retraining the machine-learning model to generate the explanation based on natural language explanation templates.

15. The system of claim 14, wherein:
    the natural language answer templates are configured to guide natural language responses from the machine-learning model to the quantitative answer and the additional answer; and
    the natural language explanation templates are configured to guide natural language explanations from the machine-learning model of the natural language responses.

16. The system of claim 13, wherein the querying includes:
    identifying the context of the query as a quantitative intent inferred from a data question based on the natural language input;
    formatting the query into a data query for querying through the second interface the external data set based on the data question and the quantitative intent;
    receiving, from the second interface, a quantitative answer to the data question in response to querying the external data set based on the data query; and
    determining the quantitative answer to the query based on the quantitative answer to the data question.

17. A non-transitory computer-readable medium storing executable instructions, which when executed by a processing device, cause the processing device to perform operations comprising:
    receiving a natural language input from a first interface to a machine-learning model including a query for quantitative information computed from an external data set;
    determining an additional query based on a context of the query;
    querying the machine-learning model using the query and the additional query to obtain quantitative results from accessing the external data set through a second interface shared with the external data set;
    receiving, from the machine-learning model, a result based on the quantitative results obtained from the second interface including a quantitative answer to the query, an additional answer based on the additional query, and an explanation by the machine-learning model of how the machine-learning model generated the quantitative answer or the additional answer in response to the querying; and
    presenting the result for display in a user interface.

18. The non-transitory computer-readable medium of claim 17, wherein:
    the query includes a plurality of different queries received from the natural language input;
    the additional query includes a respective additional query determined for each of the plurality of different queries based on a respective context of that different query; and
    the result includes:
      a respective quantitative answer for each of the plurality of different queries;

a respective additional answer for the respective additional query determined for each of the plurality of different queries; and an explanation by the machine-learning model of how the machine-learning model generated the respective quantitative answer for each of the plurality of different queries or the respective additional answer for each of the plurality of different queries.

19. The non-transitory computer-readable medium of claim 17, wherein the presenting includes:

presenting the result to include one or more graphical indications of the quantitative answer to the query, the additional answer based on the additional query, and the explanation.

20. The non-transitory computer-readable medium of claim 17, wherein, the querying includes:

identifying the context of the query as a quantitative intent inferred from a data question based on the natural language input;

formatting the query into a data query for querying through the second interface the external data set based on the data question and the quantitative intent;

receiving, from the second interface, a quantitative answer to the data question in response to querying the external data set based on the data query; and determining the quantitative answer to the query based on the quantitative answer to the data question.

\* \* \* \* \*